3,632,674
BLEND OF ETHYLENE POLYMER, CRYSTALLINE POLYPROPYLENE POLYMER AND CRYSTALLINE ETHYLENE-PROPYLENE BLOCK COPOLYMER

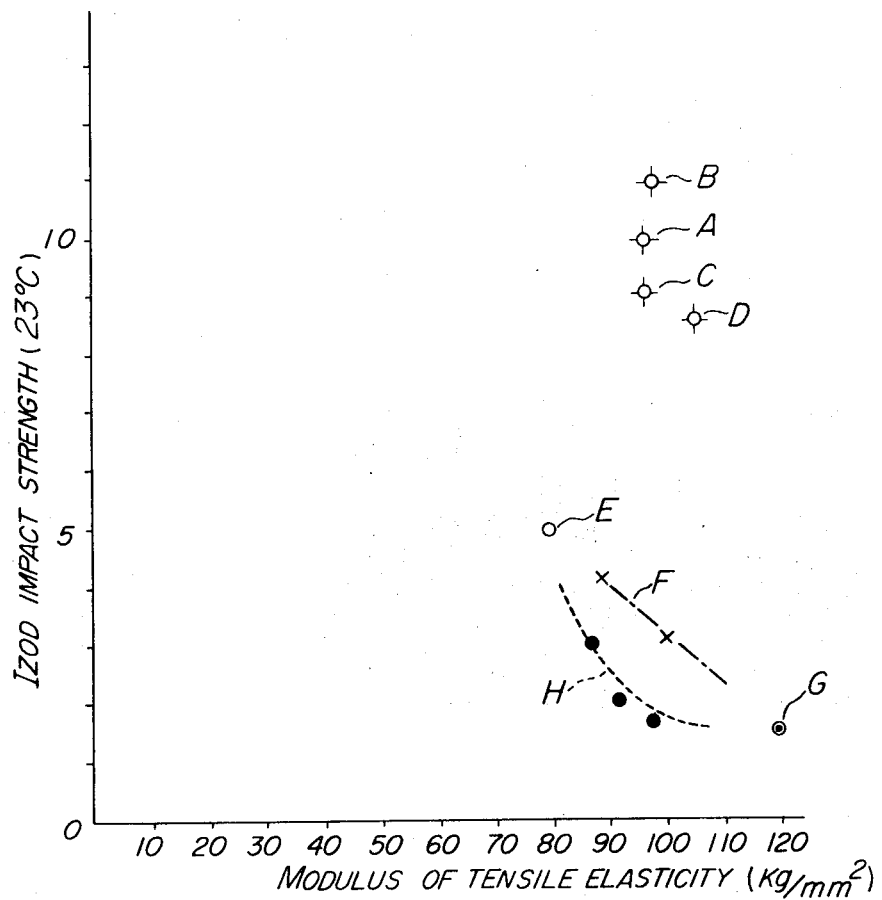

Itsuho Aishima, 13–3 Tairamachi 2-chome, Meguro-ku Tokyo, Japan; and Hisaya Sakurai, Atsushi Kitaoka, and Yoshihiko Katayama, all of 181 Kami Kotanaka, Kawasaki-shi, Japan
Filed Oct. 25, 1968, Ser. No. 770,546
Claims priority, application Japan, Nov. 2, 1967, 42/70,256
Int. Cl. C08f 29/12
U.S. Cl. 260—876 B      9 Claims

ABSTRACT OF THE DISCLOSURE

The present novel polymer composition comprises (A) 50 to 95% by weight of ethylene polymer having a density of at least 0.94 or statistical copolymer of ethylene containing not more than 10% by weight of α-olefin, or a mixture thereof, (B) 2 to 40% by weight of highly oriented crystalline polypropylene containing at least 80% by weight of boiling-heptane insolubles or statistical copolymer of polypropylene containing not more than 10% by weight of α-olefin, or a mixture thereof, and (C) 3 to 40% by weight of block copolymer of ethylene and propylene, and has a good flow characteristic and good processability. The product obtained from the present composition is excellent in both impact strength and rigidity and has highly balanced physical properties. As a result, shaped articles, films, etc. can be readily produced at low costs from the present composition.

---

This invention relates to a polymer composition consisting mainly of high density polyethylene. More particularly, the present invention relates to a polymer composition of three components having improved processability, which can provide a product of good rigidity, high impact strength and well-balanced physical properties, by mixing crystalline polypropylene (B) and a block copolymer (C) of ethylene and propylene into high density polyethylene (A) serving as the major component.

The well-known high density polyethylene produced according to the medium or low pressure process has been recently processed into shaped articles, films, etc., and has been used in various fields. Since high density polyethylene has such advantages as light weight, good processability, high durability, etc. its field of use is expected to increase. One of the greatest uses is to produce large vessels for industrial use, that is, various conveyor vessels and storage vessels, capable of replacing the conventional wooden, iron or other metallic vessels.

The qualities required for such use are rigidity and impact strength sufficient to make the vessel durable, particularly a high impact strength at a low temperature, etc. That is, it is necessary that the vessel be rigid, and has a high impact strength and good durability. In other words, it is necessary that the physical properties of the polymer product be well balanced.

However, high density polyethylene product is excellent in low temperature impact strength, but has the following disadvantages: The high density polyethylene product is poor in rigidity as represented by surface hardness and modulus of elasticity; resistance as represented by tensile strength, bending strength, compression strength, etc.; high-temperature resistance; and continuous or non-continuous stress resistance for a substantial duration. That is, the high density polyethylene product does not possess well-balanced physical properties and thus has the necessary qualities for use in the large vessel for industrial use.

Highly crystalline polypropylene product has the rigidity required for large vessel for industrial purposes, but is poor in impact resistance, particularly in low-temperature impact strength, and has not the necessary well-balanced physical properties. Consequently, it is the present situation that the use of high density polyethylene or highly crystalline polypropylene, or the like in such fields for producing large vessels for industrial use, etc. has been greatly retarded.

Many processes have been heretofore proposed to improve the rigidity of high density polyethylene product. According to one of these proposed processes, the rigidity of the product is improved by mixing an inorganic substance, for example, silica, carbon, clay, calcium carbonate, etc. to the high density polyethylene as a reinforcing agent. However, on the contrary, the tensile strength, tension resistance, elongation, etc. of the product are decreased as a result of said process. The brittle point temperature of the product is also increased and the impact strength of the product is considerably deteriorated. Thus, such a proposed process is not useful for producing a product having the required balanced physical properties.

According to another proposed process, it is intended to improve the rigidity, strength, high-temperature resistance, etc. of the product by mixing high density polyethylene with crystalline polypropylene. When the crystalline polypropylene is mixed with the high density polyethylene, the rigidity, strength, etc. of the product are improved by increasing an amount of crystalline polypropylene, but the low-temperature impact strength, which is an excellent property of the high density polyethylene product, is considerably deteriorated by adding even a small amount of crystalline polypropylene to the high density polyethylene. Thus, the proposed process is not useful for producing a product having the required balanced physical properties. Further, no practical increase in rigidity and strength of the product are expected in the range at which the impact strength by no means undergoes considerable decrease.

This relation is illustrated in the accompanying drawing. The accompanying drawing is a graph showing the relations between the modules of tensile elasticity and Izod impact strength of the product produced from the present composition and the component resin products in comparison. In the graph, the modulus of tensile elasticity, which is typical of the rigidity, is plotted on the abscissa, and the Izod impact strength, which is typical of the impact strength, is plotted on the ordinate. Said relation, when plotted in said graph, follows a curve on the dotted line, and it is seen that a composition for the product having both good rigidity and high impact strength, that is, a composition for the product having well-balanced physical properties cannot be obtained.

The object of the present invention is to improve such mechanical properties as rigidity, strength and high-temperature resistance of a high density polyethylene product whose mechanical properties have not been made better according to the various well-known processes. It is also an object to improve such processability as flow characteristic of molten high density polyethylene; and to improve the physical properties of the product suitable for practical application, and a further object is to provide a composition for producing a novel and useful product without impairing the impact strength characteristic of the high density polyethylene product but rather imparting a higher impact strength thereto. Such object can be attained by the polymer composition of the present invention.

The present polymer composition consists of high density polyethylene serving as the major component, crystalline polypropylene and a copolymer of ethylene and propylene having any desired periodic repetition. The present composition has such good processabilities as improved melt flow characteristic, etc. A product obtained from the present composition has considerably improved rigidity, strength, high-temperature resistance and low-temperature impact strength in addition to well-balanced physical properties. The surface of the product is also in a good state.

In this case, when synthetic rubber based on an amorphous copolymer of ethylene and propylene, etc. are used in place of the block copolymer of ethylene and propylene, the thus prepared product is lower in rigidity, high temperature resistance, low temperature impact strength, etc. than the product prepared from the present composition, and has not the same well-balanced physical properties.

One of the characteristics of the present composition is to provide a product having improvements in rigidity, strength, high-temperature resistance, etc. without lowering the impact strength of high density polyethylene product, but rather imparting higher impact strength thereto.

In the accompanying drawing, it is shown that both the modulus of tensile elongation and Izod impact strength of the products of Examples 1 to 4, which are obtained from the present composition, are better than those of crystalline polypropylene product, high density polyethylene product and a product prepared from a two-component composition of crystalline polypropylene and high density polyethylene and a product prepared from a two-component composition of high density polyethylene and a block copolymer of ethylene and propylene. That is, it is seen from the graph that the products obtained from the present composition located at right upper side in the graph, that is, in farthest locations from the origin, and have well-balanced physical properties.

Other advantages of the present composition are that the low-temperature impact strength and rigidity can be considerably improved, that is, the well-balanced physical properties can be imparted to products produced from the present composition; the melt flow characteristic, that is, processability of the present composition, can be improved; the continuous or non-continuous stress resistance for a substantial duration can be improved; and films, shaped articles and other products can be readily produced from the present composition at an economically low cost, as compared with crystalline polypropylene, high density polyethylene, a two-component composition of high density polyethylene and crystalline polypropylene or a two-component composition of high density polyethylene serving as a major component and a block copolymer of ethylene and propylene.

The reason why the present compositon has such characteristics has not yet been completely clarified, but it appears that the constituent ethylenic chain of the block copolymer of ethylene and propylene has chemical and physical affinities toward the high density polyethylene; other constitutent propylenic chain portion thereof toward the crystalline polypropylene; and another constituent chain portion of ethylene-propylene statistical copolymer toward both high density polyethylene and crystalline polypropylene. That is, the present composition is quite distinguished from a simple component polymer blend not only in macroscopic structure but also in microscopic structure, and thus it seems that on account of a synergistic effect of the components, the present composition has such good processability as a good melt flow characteristic, and the product obtained therefrom has excellent rigidity and impact strength, that is, well-balanced physical properties.

Observation with an electron microscope or an optical microscope based on the usual method for making sure that the peculiarity of the structural units of the present composition brings about the features of the present composition reveals that the crystal state or dispersion state is obviously peculiar. Naturally, said state depends somewhat upon the component ratio and the mixing state of the present composition.

The high density polyethylene serving as a component of the present composition includes polyethylene produced according to the low pressure or medium pressure process and having a density of at least 0.94, statistical copolymer of ethylene containing not more than 10% by weight of such α-olefins as butene-1, 4-methyl-pentene-1, styrene, etc., and mixture of said high density polyethylene and said statistical copolymer of ethylene. The high density polyethylene having a melt index (ASTM D 1238–57T; temperature 190° C.; load 2160 g.) of preferably 0.01–100, more preferably 0.05–20, can be used. The high density polyethylene having various melt indexes is selected from said range, depending upon the uses.

The crystalline polypropylene serving as the other component of the present composition includes highly oriented crystalline polypropylene containing at least 80% by weight of boiling-n-heptane insolubles, statistical a copolymer of propylene containing not more than 10% by weight of such α-olefin as ethylene, butene-1, 4-methyl-pentene-1, styrene, etc. and a mixture of said crystalline polypropylene and said statistical copolymer of propylene. The crystalline polypropylene having a melt index of preferably 0.01–100, more preferably 0.05–20, can be used.

The block copolymer of ethylene and propylene is a copolymer containing ethylene and propylene monomers as constituents of the copolymer, wherein the respective monomer units are not statistically distributed one from an other in the molecular chains of the polymer, but exist as blocks one from another. More particularly, the block copolymer of ethylene and propylene is the one wherein at least two kinds of such blocks as ethylene homopolymer blocks, propylene homopolymer blocks, ethylene-propylene statistical copolymer block, etc. are non-statistically distributed as constituents in the molecular chains. In this case, non-statistical distribution of at least two kinds of statistical copolymer blocks having different ratios of ethylene to propylene is included therein.

As to the block copolymer and the method for preparing the same, M. Zback et al. discloses in the Journal of the American Chemical Society, 78, page 2656 (published in 1956) that, for example, a block copolymer of butadiene and styrene can be prepared using naphthalene anion as an initiator in a state where the polymer molecular chain can keep a latent growing ability by ionic polymerization, but it is easy to apply it to the manufacture of olefin block copolymer.

As the block copolymerization catalysts, well-known polymerization catalysts having a steric peculiarity and being capable of polymerizing olefins into a crystalline olefin polymer, for example, the typical catalyst consisting of an organometallic compound of a metal of the Periodic Table, Groups I to III or a halogen compound of transition metal elements of Groups IV to VIII, can be used.

For example, according to one of the copolymerization methods for obtaining a block copolymer of ethylene and propylene, the polymerization reaction is carried out by allowing propylene and ethylene or a mixture of ethylene and propylene to come in contact with said polymerization catalyst periodically and alternately. According to another polymerization method, the polymerization reaction is carried out by allowing either ethylene and a mixture of ethylene and propylene, or a mixture of ethylene and propylene, where propylene is a major component, and a mixture of ethylene and propylene, where ethylene is a major component, to come in contact with said polmerization catalyst periodically and alternately.

In order to allow various kinds of olefins to come in contact, in a single-component state, with the polymerization catalyst of steric peculiarity periodically and alternately, an operation cleaning for the catalyst surface free from the olefin monomers may be carried out, using such an inert gas as nitrogen, helium, or the like, or after the olefins are eliminated from the catalyst surface by the use of vacuum. Then the olefin monomers may be led to the catalyst surface. Simultaneous use of these two operations can enhance the effect. Further, when contamination of the olefins is permissible, the desired object can be attained merely by leadnig the α-olefins to the catalyst surface periodically and alternately without carrying out any of said operations.

Periodic and alternate introduction of olefins can be carried out from one to any desired number of runs. Industrial copolymerization can be carried out by either a continuous or batch-type process.

The block copolymer of ethylene and propylene used in the present composition includes a block copolymer of ethylene and propylene containing 5 to 95 mol %, preferably 10 to 90 mol percent of ethylene, a three-component block copolymer of said copolymer and not more than 10% by weight of another α-olefin such as butene-1, pentene-1, 4-methylpentene-1, styrene, etc., a mixture of at least two kinds of said block copolymers having different ethylene contents from one another, and a mixture of said two-component block copolymers and said three-component block copolymers. The block copolymer of ethylene and propylene having a melt index of preferably 0.01 to 50, more preferably 0.01 to 20, and, as shown by the examples, being crystalline having an n-heptane extraction residue of from 82% to 97, can be used in the present composition.

As to the degree of polymerization of the block copolymer of ethylene and propylene used in the present composition, it is at least necessary that the sum total of the degrees of the polymerization of ethylenic chains constituting the block copolymer must not be so far from the degree of polymerization of the high density polyethylene to be mixed into the present composition or that the sum total of the degrees of polymerization of the crystalline propylenic chains constituting the block copolymer must not be so far from the degree of polymerization of the crystalline polypropylene to be added into the present composition. It is preferable that the sum total of the degrees of polymerization of the ethylenic chains and the sum total of the degrees of crystalline propylenic chains constituting the block copolymer be similar to the degree of polymerization of the high density polyethylene and the degree of crystalline polypropylene to be mixed into the present composition respectively.

That is to say, it is necessary that the ratio of the melt index of the block copolymer of ethylene and propylene to that of the high density polyethylene and the ratio of the melt index of the block copolymer of ethylene and propylene to that of the crystalline polypropylene to be added to the present composition be not more than 20, preferably not more than 10, respectively. Further, it is desirable that the melt index of the block copolymer of ethylene and propylene be lower than at least any of the melt indices of the crystalline polypropylene or the high density polyethylene. The feature of present invention is often remarkably shown when the melt index of the block copolymer of the present composition is lower than both indices of the high density polyethylene and crystalline polypropylene.

Particularly when the block copolymer of ethylene and propylene is a mixture of at least two kinds of block copolymers having different ethylene contents, more preferably when the mixture consists of at least two kinds of block copolymers containing at least 50% of ethylene and block copolymer containing less than 50% of ethylene, the product obtained from the present composition has an excellent impact strength and rigidity in addition to well-balanced mechanical properties. Further, the respective components are distributed in a uniform state in the product, and the surface characteristics of the product are highly improved. Moreover, the present composition is particularly excellent in melt flow characteristic, and its processability is improved.

In order to obtain a composition capable of producing a product having good impact strength and rigidity as well as considerably well-balanced physical properties, which are characteristic of the present invention, it is necessary to use 50 to 95% by weight of high density polyethylene, 2 to 40% by weight of crystalline polypropylene, and 3 to 40% by weight of a block copolymer of ethylene and propylene. It is particularly preferable to use 50 to 90% by weight of high density polyethylene, 5 to 40% by weight of crystalline polypropylene and 5 to 40% by weight of block copolymer of a ethylene and propylene. When the composition is outside these component ranges, a composition capable of producing a product having considerably well-balanced physical properties, which is characteristic of the present composition, cannot be obtained, but only a product having a poor practical value can be obtained.

Small amounts of the ordinary heat stabilizers, light stabilizers and other various stabilizers can be added to the present composition and used. Of course, it is desirable to use the well-known conventional means to prevent deterioration of the respective component polymers during the mixing and shaping steps or any other practical operation.

In carrying out mixing to prepare the present composition, it is important to homogenize the components in the molten state. That is, it is necessary to conduct the mixing in a temperature range for attaining the optimum homogenization.

A desirable temperature range for mixing is from the temperature corresponding to the highest melting point among those of the high density polyethylene, crystalline polypropylene and block copolymer of ethylene and propylene constituting the present composition up to the temperature at which the present composition undergoes decomposition and preferably 200° to 300° C.

For the purpose of mixing, roll mixing, screw-extruder mixing, banbury-type mixing or any other well-known convenient mixing procedure can be used. In mixing the high density polyethylene, crystalline polypropylene and block copolymer of ethylene and propylene, these three components may be mixed together simultaneously, or two components among the three may be mixed first and then the remaining component may be added to the two-component mixture and further mixed.

In order to concretely illustrate the present composition, the present invention is explained with reference to the following examples. Percentages shown in the examples are by weight, unless otherwise indicated.

EXAMPLES 1 TO 4

Ethylene containing a small amount of hydrogen was subjected to polymerization in n-hexane for one hour, using a catalyst consisting of a reaction mixture of titanium tetrachloride and diethylaluminum chloride, and then the supply of ethylene was discontinued. Unreacted ethylene monomer was removed from the product by pressure reduction, and then propylene containing a small amount of hydrogen was supplied thereto for one hour. After the supply of propylene was discontinued, the unreacted propylene monomer was removed. Again, ethylene containing a small amount of hydrogen was subjected to polymerization for one hour. The polymerization was conducted by repeating said procedure. The thus obtained copolymer was purified with methanol containing hydrochloric acid, whereby a powdery crystalline block copolymer of ethylene and propylene was obtained.

The intrinsic viscosity of the block copolymer was 2.5 (a value determined in a Tetralin solution at 135° C., which will be hereinafter referred to merely as "intrinsic viscosity"), the melt index was 1.0, and the n-heptane extraction residue was 96%. Ethylene content of the copolymer determined by infra-red absorption spectrum according to the conventional procedure for determination was 45 mol percent.

The crystalline polypropylene which was obtained under the similar conditions to those mentioned above and had an intrinsic viscosity of 2.0, melt index of 1.5 and n-heptane extraction residue of 95%, high density polyethylene having a density of 0.95 as determined at 23° C. and melt index of 4.0, and said block copolymer of ethylene and propylene were melted and kneaded in their specific proportions at 190° C. in a nitrogen atmosphere for 10 minutes by means of a Banbury mixer. Then, the kneaded mixture was passed through open rolls at room temperature to obtain a sheet-form mixture, and the sheet-form mixture was cut and passed through a screw extruder-type pelletizer at 230° C. in a nitrogen atmosphere to obtain pellets. The thus obtained pellet-form composition was compressed and shaped according to the procedure set forth in ASTM D 638–61 to obtain a test piece. The thus obtained test piece was subjected to state control for 72 hours and then the physical properties of the test piece were measured according to the ASTM codes as described below and the composition was evaluated.

Izod impact strength, ASTM D 256–50, unit: kg. cm./cm. (notched), determined at 23° C., 0° C. and −30° C.; tensile strength, ASTM D 412, unit: kg./cm.$^2$; modulus of tensile elasticity, ASTM D 638–61T, unit: kg./mm. (crosshead speed: 0.2 inch/minute); Rockwell hardness, ASTM D 785–51, unit R scale falling missile impact strength: A test plate having a 2 mm. thickness is cooled at −20° C. for one hour and a missile is allowed to fall on the plate from a definite height to give an impact to the plate using a falling missile impact tester made by Toyo Seiki Seisakusho.

Energy required for breakage of the test plate is represented in kg. m., heat distortion temperature, ASTM D 648–58T 66 p.s.i., unit ° C. For comparison, crystalline polypropylene, high density polyethylene, a two-component composition of crystalline polypropylene and high density polyethylene obtained by similar mixing treatment to that for said three-component composition, and a two-component composition of high density polyethylene and a copolymer of ethylene and propylene were pelletized and shaped respectively, and the respective physical properties were likewise determined.

The thus obtained results are shown in the following Table 1.

TABLE 1

| | Composition (percent) | | | Izod impact strength (kg. cm./cm.) | | | Falling missile impact strength (kg. m.), −20° C. | Modulus of tensile elasticity (kg./mm.$^2$) | Tensile strength (kg./cm.$^2$) | Rockwell hardness (R scale) | Heat distortion temperature (° C.) |
|---|---|---|---|---|---|---|---|---|---|---|---|
| | Polyethylene | Crystalline polypropylene | Block copolymer of ethylene and propylene | 23° C. | 0° C. | −30° C. | | | | | |
| Comparison example: | | | | | | | | | | | |
| 1 | 100 | 0 | 0 | 5.2 | 4.0 | 3.8 | 6.5 | 81 | 250 | 40 | 65 |
| 2 | 90 | 10 | 0 | 2.9 | 1.9 | 2.0 | 1.5 | 87 | 260 | 52 | 70 |
| 3 | 80 | 20 | 0 | 2.0 | 1.7 | 1.5 | 1.0 | 92 | 265 | 58 | 80 |
| 4 | 70 | 30 | 0 | 1.7 | 1.5 | 1.5 | 0.5 | 97 | 275 | 61 | 90 |
| 5 | 90 | 0 | 10 | 4.0 | 2.8 | 1.9 | 3.0 | 89 | 258 | 50 | 72 |
| 6 | 70 | 0 | 30 | 3.0 | 2.0 | 1.5 | 1.0 | 100 | 280 | 63 | 88 |
| 7 | 0 | 100 | 0 | 1.5 | 1.4 | 1.4 | 0.01 | 118 | 390 | 87 | 116 |
| Example: | | | | | | | | | | | |
| 1 | 70 | 15 | 15 | 10.0 | 6.0 | 4.5 | 7.3 | 95 | 287 | 60 | 91 |
| 2 | 70 | 10 | 20 | 11.0 | 7.0 | 4.9 | 7.8 | 96 | 288 | 61 | 95 |
| 3 | 80 | 10 | 10 | 9.0 | 6.0 | 4.2 | 5.7 | 95 | 280 | 60 | 85 |
| 4 | 60 | 20 | 20 | 8.5 | 4.5 | 4.0 | 6.0 | 105 | 297 | 75 | 100 |

As is clear from Table 1, the present compositions as shown in Examples 1 to 4 can provide products having a good impact strength, good rigidity and good strength, that is, well-balanced physical properties, as compared with high density polyethylene, crystalline polypropylene, a two-component mixture of crystalline polypropylene and high density polyethylene, and a two-component composition of high density polyethylene and block copolymer of ethylene and propylene.

The characteristics of the present composition are quite excellent, as shown in the accompanying drawing.

EXAMPLES 5 to 7

A block copolymer of ethylene and propylene, which was obtained in the same manner as that of Examples 1 to 4 except that ethylene containing a small amount of hydrogen was supplied in a different amount and had an intrinsic viscosity of 2.0, melt index of 1.9, n-heptane extraction residue of 96% and an ethylene content of 10 mol percent determined by infra-red absorption spectrum according to the conventional procedure for determination, and a block copolymer of ethylene and propylene having an intrinsic viscosity of 3.0, melt index of 0.5, n-heptane extraction residue of 97% and ethylene content of 80 mol percent were properly mixed so that the mixture of block copolymers of ethylene and propylene has an ethylene content of 64 mol percent.

Three-component compositions having the composition shown in the following Table 2 were prepared from crystalline polypropylene and high density polyethylene used in Examples 1 to 4 and said mixture of block copolymers. In the same manner as in Examples 1 to 4, test pieces were prepared and their physical properties were evaluated according to ASTM codes.

TABLE 2

| Example | Composition (percent) | | | Izod impact strength (kg. cm./cm.) | | | Falling missile impact strength (kg. m.), −20° C. | Modulus of tensile elasticity (kg./mm.$^2$) | Tensile strength (kg./cm.$^2$) | Rockwell Hardness (R scale) | Heat distortion temperature (° C.) |
|---|---|---|---|---|---|---|---|---|---|---|---|
| | Polyethylene | Crystalline polypropylene | Block copolymer of ethylene and propylene | 23° C. | 0° C. | −30° C. | | | | | |
| 5 | 60 | 10 | 10 | 11.0 | 6.2 | 4.7 | 8.0 | 96 | 285 | 62 | 79 |
| 6 | 70 | 20 | 10 | 10.5 | 5.5 | 4.2 | 7.5 | 99 | 290 | 65 | 89 |
| 7 | 60 | 20 | 20 | 12.5 | 7.0 | 5.0 | 9.0 | 110 | 300 | 75 | 100 |

As shown in Table 2, the products obtained from the present compositions as shown in Examples 5 to 7 had good impact strength and good rigidity, that is, well-balanced physical properties. Further, the present composition had a particularly good processability and the product had also a good surface characteristic, when shaped.

EXAMPLES 8 TO 9

A block copolymer of ethylene and propylene, which was prepared in the same manner as in Examples 1 to 4 except that a mixture of ethylene and propylene containing a small amount of hydrogen was used in place of the propylene containing a small amount of hydrogen and had an intrinsic viscosity of 1.9, melt index of 2.3, n-heptane extraction residue of 82%, and ethylene content of 89 mol percent determined by infra-red absorption spectrum according to the conventional procedure, crystalline polypropylene, which was prepared under the same conditions as in Examples 1 to 4 and had an n-heptane extraction residue of 96%, intrinsic viscosity of 1.8 and melt index of 3.0, and high density polyethylene having a density of 0.95 and melt index of 2.0 were mixed in the respective proportions as shown in Table 3 to prepare a series of three-component compositions.

The physical properties of the products obtained in the same manner as in the foregoing examples were determined according to the same procedures as in the foregoing examples, and the thus obtained results are shown in the following Table 3. It is clear that the products obtained from the present compositions of Examples 8 and 9 have excellent impact strength and rigidity.

crystalline polypropylene of Examples 8 to 9, and the same high density polyethylene and block copolymer of ethylene and propylene as used in Examples 8 to 9.

|  | Percent |
|---|---|
| High density polyethylene | 80 |
| Block copolymer | 10 |
| Statistical copolymer of propylene | 10 |

The physical properties of a product obtained from the present composition of Example 12 were determined, and the results obtained are shown below:

Izod impact strength:
- (23° C.) _____ 10.0
- (0° C.) _____ 7.5
- (−30° C.) _____ 5.0

Rockwell hardness _____ 57
Modulus of tensile elasticity _____ 93

The product thus obtained had both excellent rigidity and impact strength, as compared with those obtained in

TABLE 3

| Example | Composition (percent) | | | Izod impact strength (kg. cm./cm.) | | | Falling missile impact strength (kg. m.), −20° C. | Modulus of tensile elasticity (kg./mm.²) | Tensile strength (kg./cm.²) | Rockwell Hardness (R scale) | Heat distortion temperature (° C.) |
|---|---|---|---|---|---|---|---|---|---|---|---|
|  | Poly-ethylene | Crystalline polypropylene | Block copolymer of ethylene and propylene | 23° C. | 0° C. | −30° C. |  |  |  |  |  |
| 8 | 70 | 10 | 20 | 14.0 | 8.5 | 5.0 | 7.5 | 96 | 287 | 65 | 90 |
| 9 | 80 | 10 | 10 | 9.0 | 6.5 | 4.5 | 7.1 | 93 | 282 | 60 | 77 |

EXAMPLES 10 TO 11

A block copolymer, which was prepared in the same manner as in Examples 1 to 4 except that a mixture of ethylene and propylene containing a small amount of hydrogen was used in place of the ethylene containing a small amount of hydrogen and had an intrinsic viscosity of 1.9, melt index of 2.1, n-heptane extraction residue of 85%, and ethylene content of 11 mol percent determined by infra-red spectrum according to the conventional procedure, high density polyethylene and crystalline polypropylene used in Examples 1 to 4, were mixed in the respective proportions as shown in Table 4 to obtain three-component compositions.

Physical properties of the products prepared from the compositions were determined, and the results are given in the following Table 4. It is seen that a product having excellent impact strength and rigidity can be obtained from the present three-component compositions of Examples 10 to 11.

comparison in Examples 1 to 7, and had well-balanced physical properties. The present composition also had a good melt flowability.

EXAMPLE 13

A three-component composition having the following mixing proportion was obtained using a statistical copolymer of ethylene containing 2 mol percent of propylene and having a melt index of 6.0 and density of 0.94 determined at 23° C. in place of the high density polyethylene, and the same crystalline polypropylene and block copolymer of ethylene and propylene as used in Examples 1 to 4.

|  | Percent |
|---|---|
| Statistical copolymer of ethylene | 70 |
| Block copolymer | 20 |
| Crystalline polypropylene | 10 |

Physical properties of a product obtained from the composition were determined, and the results obtained

TABLE 4

| Example | Composition (percent) | | | Izod impact strength (kg. cm./cm.) | | | Falling missile impact strength (kg. m.), −20° C. | Modulus of tensile elasticity (kg./mm.²) | Tensile strength (kg./cm.²) | Rockwell Hardness (R scale) | Heat distortion temperature (° C.) |
|---|---|---|---|---|---|---|---|---|---|---|---|
|  | Poly-ethylene | Crystalline polypropylene | Block copolymer of ethylene and propylene | 23° C. | 0° C. | −30° C. |  |  |  |  |  |
| 10 | 70 | 15 | 15 | 5.2 | 3.5 | 3.0 | 4.9 | 94 | 287 | 66 | 91 |
| 11 | 60 | 20 | 20 | 5.0 | 3.2 | 2.9 | 4.5 | 97 | 293 | 75 | 101 |

EXAMPLE 12

A three-component composition was prepared in the following mixing composition, using statistical copolymers of propylene containing 3 mol percent of ethylene and having an intrinsic viscosity of 1.7, melt index of 2.3 and n-heptane extraction residue of 88% in place of the are given below:

Izod impact strength:
- (23° C.) _____ 6.2
- (0° C.) _____ 3.7
- (−30° C.) _____ 3.1

Rockwell hardness _____ 65
Modulus of tensile elasticity _____ 93

As shown above, a product having a good impact strength and good rigidity and improved stress crack resistance can be obtained from the composition of Example 13.

EXAMPLE 14

Propylene containing a small amount of hydrogen was subjected to polymerization for 30 minutes, using a catalyst consisting of a reaction mixture of titanium tetrachloride and diethylaluminum chloride; then the supply of propylene was discontinued; the unreacted propylene monomer was removed from the product by pressure reduction; then butene-1 containing a small amount of hydrogen was supplied for 5 minutes; then the unreacted butene-1 was removed from the product by pressure reduction; and then ethylene containing a small amount of hydrogen was supplied thereto for one hour. Again propylene monomer containing a small amount of hydrogen was introduced thereto in a state where no unreacted ethylene was present. Polymerization was conducted by repeating such procedure. The thus obtained copolymer was purified with methanol containing hydrochloric acid, whereby a powdery crystalline three-component block copolymer of ethylene, propylene and butene was obtained.

The thus obtained copolymer had an intrinsic viscosity of 2.8, melt index of 0.8 and n-heptane extraction residue of 94%. It was found from the results of determination by infra-red absorption spectrum according to the conventional procedure that the copolymer contained 72 mol percent of ethylene, 23 mol percent of propylene and 5 mol percent of butene.

A three-component composition having the following mixing proportions was prepared from crystalline polypropylene having an intrinsic viscosity of 1.5, melt index of 8.0, and n-heptane extraction residue of 95%, high density polyethylene having a density of 0.96 and melt index of 1.2, and said three-component block copolymer.

|  | Percent |
|---|---|
| High density polyethylene | 70 |
| Crystalline polypropylene | 10 |
| Three-component block copolymer | 20 |

Physical properties of a product obtained from this composition were determined, and the results obtained are given below.

Izod impact strength:
  (23° C.) _____ 12.0
  (° C.) _____ 7.8
  (−30° C.) _____ 4.9
Rockwell hardness _____ 55
Modulus of tensile elasticity _____ 91

A product have good impact strength and rigidity can be obtained from the present composition of Example 14 and its processability was also excellent.

EXAMPLE 15

A three-component composition having the following mixing proportion was prepared from a mixture in a 1:1 proportion by weight of the block copolymer of ethylene and propylene having an ethylene content of 45 mol percent used in Examples 1 to 4 and the block copolymer of ethylene and propylene having an ethylene content of 89 mol percent used in Examples 8 to 9; the statistical copolymer of propylene containing 3 mol percent of ethylene used in Example 12; and the high density polyethylene used in Examples 8 to 9.

|  | Percent |
|---|---|
| High density polyethylene | 70 |
| Block copolymer mixture | 20 |
| Statistical copolymer of propylene | 10 |

Physical properties of a product obtained from this composition were determined and the results obtained are given below:

Izod impact strength:
  (23° C.) _____ 12.8
  (0° C.) _____ 8.8
  (−30° C.) _____ 5.2
Rockwell hardness _____ 65
Modulus of tensile elasticity _____ 105

A product having good rigidity and good impact strength can be obtained from the present composition of Example 15, and the composition had good melt flowability. A good surface state of a product was obtained, when shaped.

EXAMPLE 16

A mixture in a 1:1 proportion by weight of the crystalline polypropylene used in Examples 1 to 4 and the statistical copolymer of propylene containing 3 mol percent of ethylene was used as the crystalline polypropylene. A mixture in a 1:1 proportion by weight of the high density polyethylene used in Example 1 to 4 and the statistical copolymer of ethylene containing 2 mol percent of propylene of Example 13 was used as the high density polyethylene. The three component block copolymer of ethylene, propylene and butene of Example 14 was used as the block copolymer.

A three-component composition having the following mixing proportion was prepared from said high density polyethylene mixture, crystalline polypropylene mixture and three-component block copolymer.

|  | Percent |
|---|---|
| High density polyethylene mixture | 60 |
| Crystalline polypropylene mixture | 20 |
| Three-component block copolymer | 20 |

Physical properties of a product obtained from this composition were determined, and the results obtained are given below.

Izod impact strength:
  (23° C.) _____ 7.0
  (0° C.) _____ 5.0
  (−30° C.) _____ 4.2
Rockwell hardness _____ 67
Modulus of tensile elasticity _____ 99

A product having good rigidity and good impact strength can be obtained from the present composition of Example 16, and the present composition had also good processability.

We claim:

1. A polymer composition which comprises 50 to 95% by weight of polymer (A) selected from the group consisting of an ethylene polymer having a density of at least 0.94, a statistical copolymer of ethylene containing not more than 10% by weight of an α-olefin selected from the group consisting of butene-1, 4-methylpentene-1 and styrene, or a mixture thereof, 2 to 40% by weight of polymer (B) selected from the group consisting of highly oriented crystalline polypropylene having at least 80% by weight of boiling n-heptane insolubles, a statistical copolymer of propylene containing not more than 10% by weight of an α-olefin selected from the group consisting of ethylene, butene-1,4-methylpentene-1 and styrene, or a mixture thereof; and 3 to 40% by weight of a crystalline block copolymer (C) of ethylene and propylene, said crystalline block copolymer having an n-heptane extraction residue of from 82% to 97%.

2. A polymer composition according to claim 1, wherein the block copolymer is a block copolymer of ethylene and propylene having an ethylene content of 5 to 95 mol percent, a three-component block copolymer consisting of said copolymer and not more than 10% by weight of an α-olefin selected from the group consisting of butene-1, pentene-1, 4-methylpentene-1, and styrene, a mixture consisting of at least two of said block copolymers containing different ethylene contents, or a mixture consisting of said two-component block copolymer and said three-component block copolymer.

3. A polymer composition according to claim 1, wherein the ratios of the melt index of the block copolymer of ethylene and propylene (C) to that of high density polymer (A) and that of crystalline polymer (B) are not more than 20 respectively.

4. A polymer composition according to claim 1, wherein the melt index of block copolymer of the ethylene and propylene (C) is lower than that of either the crystalline polymer (B) or the high density polymer (A).

5. A polymer composition according to claim 1, wherein the high density polymer (A), the crystalline polymer (B) and the block copolymer of ethylene and propylene (C) are mixed in a temperature range from a temperature corresponding to the highest melting point of said three components to a temperature at which the composition undergoes decomposition.

6. A polymer composition according to claim 1, wherein the sum total of the degrees of polymerization of the ethylenic chains and the sum total of the degrees of polymerization of the crystalline propylenic chains constituting the block copolymer (C) are similar to the degree of polymerization of high density polymer (A) and the degree of the polymerization of the crystalline polymer (B) to be mixed in the composition, respectively.

7. A polymer composition according to claim 1, wherein the polymer (A) has a melt index of 0.01 to 100.

8. A polymer composition according to claim 1 wherein the polymer (B) has a melt index of 0.01 to 100.

9. A polymer composition according to claim 1, wherein the polymer (C) has a melt index of 0.01 to 50.

References Cited
UNITED STATES PATENTS

| | | | |
|---|---|---|---|
| 3,262,992 | 7/1966 | Holzer et al. | 260—876 |
| 3,354,239 | 11/1967 | Short | 260—876 |
| 3,358,053 | 12/1967 | Hostetler | 260—876 |
| 3,487,128 | 12/1969 | Okazaki et al. | 260—876 |

SAMUEL H. BLECH, Primary Examiner

U.S. Cl. X.R.
260—878 B, 897 A

UNITED STATES PATENT OFFICE
CERTIFICATE OF CORRECTION

Patent No. 3,632,674  Dated January 4, 1972

Inventor(s) Itsuho Aishima, et. al.

It is certified that error appears in the above-identified patent and that said Letters Patent are hereby corrected as shown below:

In the heading column 1, line 9, after "Japan", insert -- assignors to Asahi Kasei Kogyo Kabushiki Kaisha, Kita-Ku, Osaka, Japan, a corporation of Japan -- .

Signed and sealed this 1st day of May 1973.

(SEAL)
Attest:

EDWARD M. FLETCHER, JR.
Attesting Officer

ROBERT GOTTSCHALK
Commissioner of Patents